US011271802B2

(12) United States Patent
Pawaskar

(10) Patent No.: US 11,271,802 B2
(45) Date of Patent: *Mar. 8, 2022

(54) SYSTEMS AND METHODS FOR REAL-TIME PROCESSING AND TRANSMITTING OF HIGH-PRIORITY NOTIFICATIONS

(71) Applicant: Worldpay, LLC, Symmes Township, OH (US)

(72) Inventor: Sachin Pawaskar, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/826,506

(22) Filed: Mar. 23, 2020

(65) Prior Publication Data

US 2020/0220775 A1 Jul. 9, 2020

Related U.S. Application Data

(63) Continuation of application No. 15/843,022, filed on Dec. 15, 2017, now Pat. No. 10,728,088.

(51) Int. Cl.
*H04L 12/24* (2006.01)
*H04L 41/0686* (2022.01)
*H04L 41/069* (2022.01)

(52) U.S. Cl.
CPC ........ *H04L 41/0686* (2013.01); *H04L 41/069* (2013.01)

(58) Field of Classification Search
CPC .......................... H04L 41/0686; H04L 41/069
USPC ........................................................ 709/224
See application file for complete search history.

(56) References Cited

U.S. PATENT DOCUMENTS

| | | | |
|---|---|---|---|
| 7,912,899 B2 | 3/2011 | Beauchamp et al. | |
| 10,728,088 B1* | 7/2020 | Pawaskar | H04L 63/168 |
| 2008/0162984 A1 | 7/2008 | Kalra et al. | |
| 2012/0042390 A1* | 2/2012 | Iwuchukwu | H04L 63/10 |
| | | | 726/27 |
| 2013/0120138 A1 | 5/2013 | Hicks, III | |
| 2013/0159446 A1 | 6/2013 | Carlson et al. | |
| 2015/0019654 A1 | 1/2015 | Wheeler et al. | |
| 2015/0067072 A1* | 3/2015 | Yin | H04L 51/30 |
| | | | 709/206 |
| 2015/0106121 A1 | 4/2015 | Muhsin et al. | |
| 2015/0363481 A1* | 12/2015 | Haynes | G06Q 10/10 |
| | | | 707/748 |
| 2016/0036652 A1* | 2/2016 | Bellini, III | G06F 9/44 |
| | | | 709/223 |
| 2016/0094421 A1 | 3/2016 | Bali et al. | |
| 2016/0180026 A1 | 6/2016 | Kim et al. | |

(Continued)

*Primary Examiner* — Kevin T Bates
*Assistant Examiner* — Chen-Liang Huang
(74) *Attorney, Agent, or Firm* — Bookoff McAndrews, PLLC

(57) ABSTRACT

Systems and methods are disclosed for secure transmission of high-priority computer server event notifications. One method comprises obtaining a new computer server event to report; generating a first notification message pertaining to the computer server event; generating a second notification message pertaining to the computer server event and to the delivery of the first notification message; storing the first notification message; storing the second notification message; and transmitting the first notification message to a partner over a computer network.

16 Claims, 11 Drawing Sheets

(56) References Cited

U.S. PATENT DOCUMENTS

2017/0024263 A1    1/2017   Verplanken
2017/0124669 A1*   5/2017   Finkel ..................... G06F 21/64
2018/0130327 A1*   5/2018   Rogers ............... G08B 21/0222
2018/0367212 A1*   12/2018  Reis ................... H04B 7/18513

* cited by examiner

SYSTEMS AND METHODS FOR REAL-TIME PROCESSING AND TRANSMITTING OF HIGH-PRIORITY NOTIFICATIONS

CROSS-REFERENCE TO RELATED APPLICATION(S)

This patent application is a continuation of and claims the benefit of priority to U.S. application Ser. No. 15/843,022, filed on Dec. 15, 2017, the entirety of which is incorporated herein by reference.

TECHNICAL FIELD

The present disclosure relates generally to the field of inter-system computer communications and, more particularly, to providing secure transmission of high-priority computer server event notifications between systems.

BACKGROUND

In distributed computing systems, such as one supporting collaborative practices including, for example, financial services and electronic payment transactions, events arising within one distributed partner's environment may be significant to other distributed partners. Events may be related to, for example, business processes, data synchronization, updating status of records, error conditions, etc. Thus, it is important that such distributed systems provide mechanisms for notifying such events to other partners within the distributed computing system. Existing distributed computing systems rely, for example, on file transfers or on polling application programming interfaces (APIs), etc. for computer server event notifications or calling partner APIs. However, these mechanisms suffer from high computing resource costs, delays and lack of security, and may be subject to changes in underlying APIs that force changes in other parts of the distributed system.

Systems and methods for notifying distributed partners of events have previously been disclosed. For example, systems have been disclosed wherein a partner subscribes to topics and receives notifications. However, under these systems, only certain details may be provided to a partner in the initial notification, and the partner may be required to engage in several iterative communications with the computer server. For some types of high-priority notifications, it is desirable to provide alerts to distributed partners without the distributed partner needing to retrieve event details as a separate action.

Accordingly, there is a need for methods and systems for providing transmission and registration of high-priority computer server event notifications between disparate systems that are efficient, secure, and scalable.

SUMMARY

According to certain aspects of the present disclosure, systems and methods are disclosed for providing secure transmission of computer server event notifications.

In one embodiment, a computer-implemented method is disclosed for secure transmission of high-priority computer server event notifications, the method comprising: obtaining a new computer server event to report; generating a first notification message pertaining to the computer server event; generating a second notification message pertaining to the computer server event and to the delivery of the first notification message; storing the first notification message; storing the second notification message; and transmitting the first notification message to a partner over a computer network.

In accordance with another embodiment, a system is disclosed for secure transmission of high-priority computer server event notifications. The system comprises: a memory having processor-readable instructions stored therein; and a processor configured to access the memory and execute the processor-readable instructions, which when executed by the processor configures the processor to perform a plurality of functions, including functions for: obtaining a new computer server event to report; generating a first notification message pertaining to the computer server event; generating a second notification message pertaining to the computer server event and to the delivery of the first notification message; storing the first notification message; storing the second notification message; and transmitting the first notification message to a partner over a computer network.

In accordance with another embodiment, a non-transitory machine-readable medium is disclosed that stores instructions that, when executed by a computer, cause the computer to perform a method for secure transmission of high-priority computer server event notifications. The method includes: obtaining a new computer server event to report; generating a first notification message pertaining to the computer server event; generating a second notification message pertaining to the computer server event and to the delivery of the first notification message; storing the first notification message; storing the second notification message; and transmitting the first notification message to a partner over a computer network.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Figure 1:
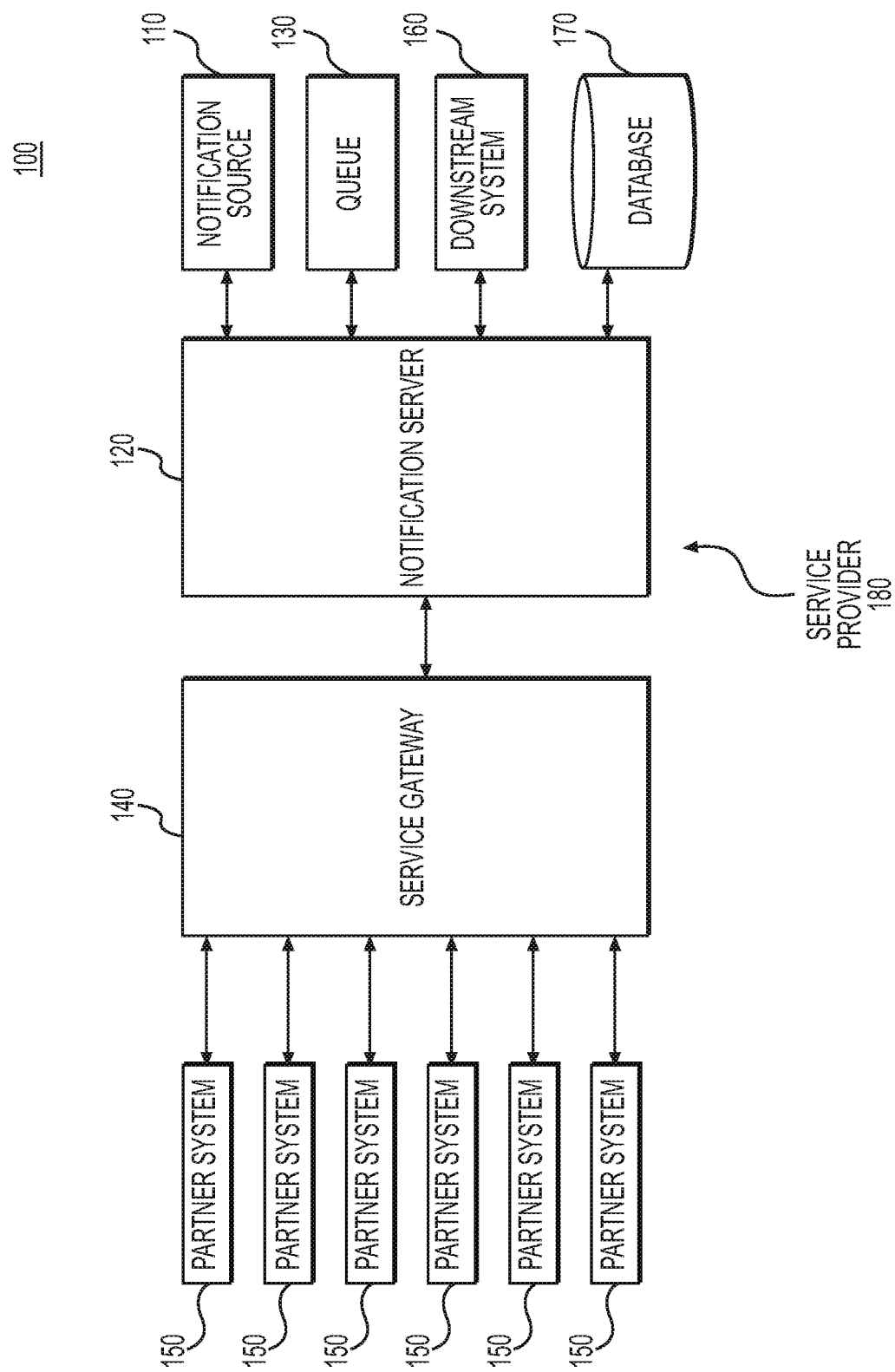
FIG. 1 depicts a block diagram of a system for secure transmission of high-priority notification messages, according to one or more embodiments.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for installing and managing point of interaction devices within a merchant environment.

As described above, existing methods for computer server event notifications in distributed computing systems may suffer from high computing resource costs, high maintenance costs, and lack of security. Thus, the embodiments of the present disclosure are directed to providing scalable and secure systems and methods for transmission of computer server event notifications. Existing methods which may be suitable for lower priority notifications may also be unsuitable for high-priority notification messages due to the need to have multiple rounds of communication in order to deliver the notification. Thus, the embodiments of the present disclosure are directed toward providing high-priority notification messages in a way that avoids the need for repeated communication back and forth.

One or more embodiments are disclosed which receive information warranting a high-priority notification message and generate a high-priority notification message along with a delayed delivery message. The high-priority notification message may be delivered to a partner system. The high-priority notification message may contain all of the relevant details within the message itself, without the partner system having to request further message details. Thus, communications between a service provider and a partner system may be limited to delivery of a high-priority notification message, acknowledgment of the high-priority notification message by the partner system, and an update from the partner system. For example, communications from a partner system requesting further notification details are not required. The generated delayed delivery message may be delivered to a downstream system in case a partner system fails to acknowledge a high-priority notification message or to provide a necessary update. Transmission of such delayed delivery messages may be required by, for example, a service level agreement ("SLA"). Prior to delivery, one or both of the high-priority notification message and delayed delivery message may be placed in a queue. The disclosed embodiments thus facilitate automatic notifications to both partner systems and downstream systems. These automatic notifications may take place in real-time or in close to real-time. The embodiments facilitate, for example, real-time communication of fraud alerts and automatic notifications to downstream systems in case a fraud alert is not acknowledged by a partner system or a partner system does not provide an update after acknowledging a fraud notification. In contexts such as fraud alerts, speed of communication and automatic processing of third-party updates is necessary and/or critical given the high-speed nature of the transactions at issue.

One or more examples of these non-limiting embodiments are illustrated in the selected examples disclosed and described in detail with reference to FIGS. 1-13 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 shows a schematic diagram of distributed computer system 100, which may include service provider 180, along with one or more notification source(s) 110, partner system(s) 150, and downstream system(s) 160. Service provider 180 may include notification server 120, queue 130, service gateway 140, and database 170. As shown in FIG. 1, in a distributed computing system 100, multiple computing systems may receive notifications of computer server events from other connected computing systems. For example, one or more partner systems 150 may receive computer server event notifications such as high-priority event notifications from a notification server 120. In addition to general computing systems, partner systems 150 may include specialized computing systems. For example, in financial services systems, the partner systems 150 may include, for example, underwriting services systems, contractual adjustment pricing systems, parties accepting payments, credit card issuers, or other financial service providers.

Communication of the computer server event notification such as a high-priority event notification may be by way of a service gateway 140. Service gateway 140 may provide secure communication between notification server 120 and partner systems 150. Interaction between service gateway 140 and partner systems 150 may be according to specified APIs providing, for example, topic subscription and notification messaging. These APIs will be discussed in further detail below. Interfacing with the service gateway API may allow the notification server API to be modified without disturbing the implementation of the partner system 150. Similar API abstractions may be published for APIs published by partner systems, such as, for example, partner systems 150. Security protocols provided by the service gateway and notification server may include, for example, message authentication codes (MAC), JavaScript Object Notation (JSON) Web Tokens (JWT), or secure Hypertext Transfer Protocol Secure (HTTPS), etc.

Notification server 120 may store information about, for example, partner systems 150, subscriptions, events, notifications, etc., in a database 170. Although database 170 is depicted as a single database, it is to be appreciated that multiple databases 170 may be employed. For example, separate databases and/or tables may be provided different types of events. Separation of databases and/or tables for an event type may facilitate auditing or compliance reporting for events of a certain type. Such separation may also improve performance of distributed computing system 100 by isolating high-frequency event types from low-frequency event types.

Notification server 120 may receive information regarding notifications from notification source 110. Notification source 110 can be any internal or external system or entity that gives rise to information regarding an event, update, or other occurrence that involves notifying partner systems 150.

Notification server 120 may also communicate with one or more downstream systems 160. A downstream system 160 may, for example, be a consumer credit and/or risk management company.

Notification server 120 may utilize a data structure such as a queue 130 for storing information regarding high-priority notification messages or high-priority notification messages themselves. Queue 130 may be any known type of system currently known or which may become known for storing and ordering data. For example, queue 130 may be a database queue or a message queue or any other suitable data structure.

A service provider 180 may include notification server 120, queue 130, service gateway 140, and database 170. In the alternative, service provider 180 may comprise a subset of these components. Notification source 110, partner systems 150, and downstream system 160 may be third parties. In the alternative, notification source 110 and downstream system 160 may be part of service provider 180.

Figure 2:
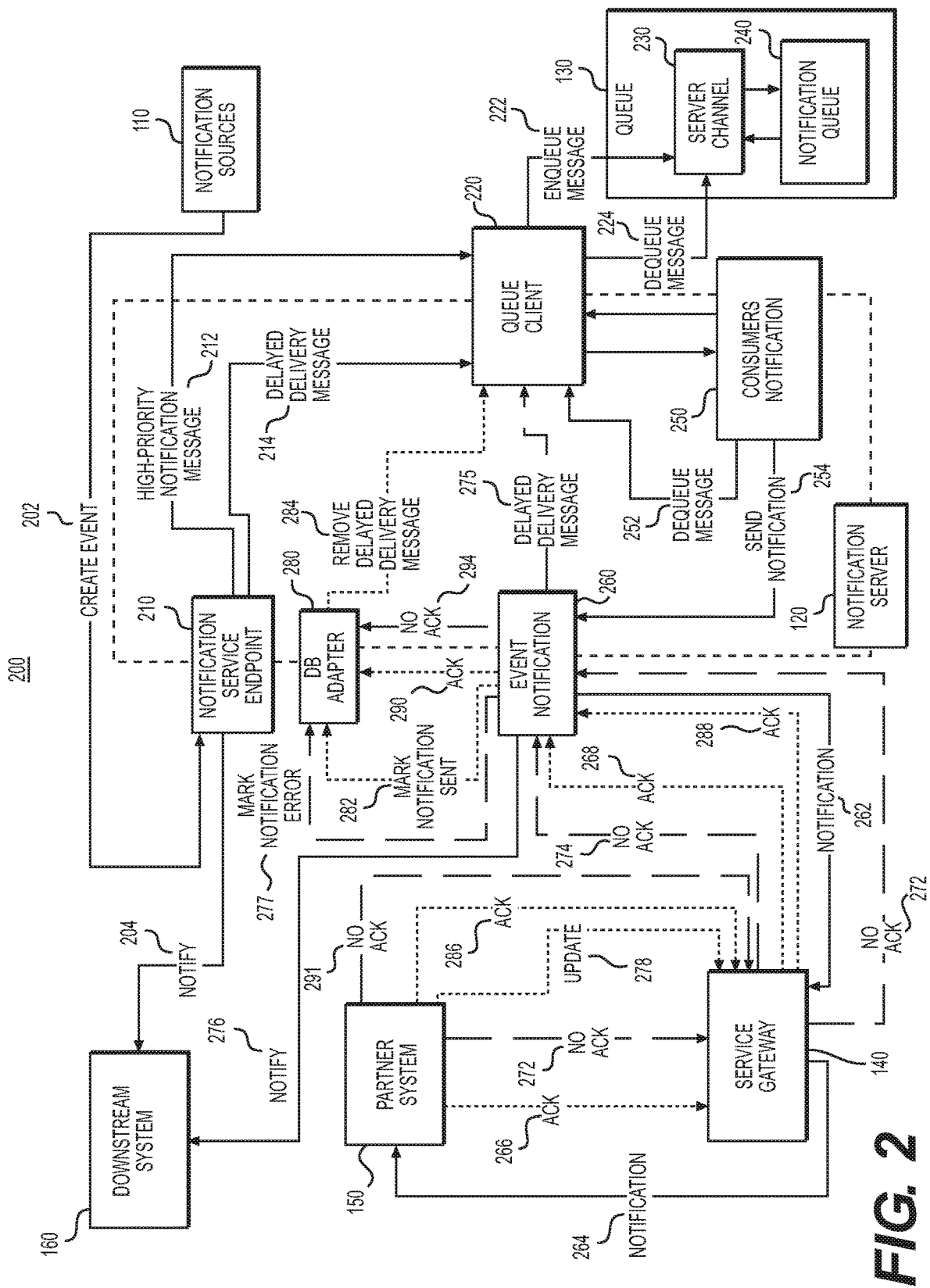
FIG. 2 is a flow chart depicting an example process for secure transmission of high-priority notification messages, according to one or more embodiments.

FIG. 2 is a flow chart depicting an example method 200 for processing and transmitting high-priority notification messages. These high-priority notification messages may be said to be delivered in real time. As shown in FIG. 2, a partner distributed computing system, such as partner system 150 depicted in FIG. 1, may communicate with a server, such as notification server 120 depicted in FIG. 1, with or without mediation by an additional gateway system, such as service gateway 140 depicted in FIG. 1. Routing communications between the service provider 180 and the partner systems 150 via the service gateway 140 may reduce the number of rules that are put in place for network pathways.

Upon receiving information from notification source 110 giving rise to a need to transmit a high-priority notification message to partner system 150, a server, such as notification server 120, may initiate operation 202 to open a case. The create event operation 202 is any operation which indicates to notification server 120 that a high-priority notification message is to be sent to partner system 150 and which initiates the high-priority notification message, for example a "create event—open fraud case" operation. The create event operation 202 may initiate the gathering by notification server 120 of information components that will be transmitted to the partner system in the high-priority notification message. Such information components may include a notification ID, notification type, and details of the notification itself, discussed in further detail below. Such information components may be gathered by a notification service endpoint 210 or any other suitable component of notification server 120.

Following initiation of the high-priority notification message, notification server 120 in operation 212 generates a high-priority notification message for delivery to a partner system 150 and transmits the high-priority notification message to, for example, a queue client 220. Notification service endpoint 210 and/or notification server 120 also generates in operation 214 a delayed delivery message to be transmitted to a downstream system 160 in case of an error. Notification service endpoint 210 or any other suitable component of notification server 120 may create and transmit the high-priority notification message and the delayed delivery message. In the alternative, separate components can create the messages and transmit the messages to queue client 220. In yet another alternative, only a high-priority notification message may be created according to operation 212, and a delayed delivery message may be generated in a separate step.

In addition to or in the alternative to performing operation 212, notification server 120 may in operation 204 notify a downstream system 160 of the opening of a case such as a fraud case. For example, operation 204 may be performed if partner system 150 has not opted to use a method for processing and transmitting high-priority notification messages such as that of exemplary method 200. In that case, a partner system 150, a service provider 180, and a downstream system 160 may go about processing information giving rise to an event created in operation 202 in another manner.

In operation 222, the high-priority notification message may be stored in queue 130 and the delayed delivery message may be stored in a different queue. In the alternative, at operation 222, both the high-priority notification message and the delayed delivery message may be stored in queue 130. As explained above, queue 130 may be any suitable data structure that is known or to be discovered for storing and organizing data—for example, queue 130 can be a database queue or a message queue. Queue 130 may include components such as a server channel 230 and a notification queue 240. The stored message(s) may be packaged in their final form for eventual distribution to partner system 150 prior to storage in queue 130. Alternatively, a portion of the final high-priority notification message for delivery to partner system 150 may be stored in queue 130. This portion may include a subset of the information in the final high-priority notification message. The relevant component or components of notification server 120, for example queue client 220, may communicate with the relevant components of queue 130, such as server channel 230. Server channel 230 may communicate with notification queue 240.

There may be a time delay between the storage of the high-priority notification message and/or the delayed delivery message in queue 130 and the delivery of the high-priority notification message to a partner system 150. This time delay can be of varying lengths. In the alternative, there may be no time delay or essentially no time delay between the storage of a high-priority notification message and/or a delayed delivery message in queue 130 and the delivery of the high-priority notification message to partner system 150.

Following the time delay, if any, a high-priority notification message may be dequeued. A component such as a consumers' notification component 250 or any other suitable component may at operation 252 indicate to queue client 220 or any other suitable component that the high-priority notification message should be dequeued. Consumers' notification component 250 may be a consumer of queue 130 and may interface with queue 130 via queue client 220. Alternatively, queue client 220 itself or another suitable component can initiate the dequeueing of the high-priority notification message. At operation 224, notification server 120 notifies queue 130 that the high-priority notification message is to be dequeued. Operation 224 may originate from queue client 220 or any other suitable component. If a delayed delivery message has been queued in queue 130 or another queue, the delayed delivery message may also be dequeued along with the high-priority notification message. Alternatively, the delayed delivery message may remain in the queue 130 or another queue for the time being. In yet another alternative, the delayed delivery message may be dequeued but may remain in the queue client 220 or other suitable component.

At operation 254, a dequeued message may be sent to a component of notification server 120 such as an event notification component 260. A delayed delivery message may also be transmitted to event notification component 260 in operation 254. Alternatively, the delayed delivery message may remain in queue 130 or another queue or may never have been enqueued in queue 130. For example, the delayed delivery message may have remained in queue client 220 or in another component of notification server 120. If the delayed delivery message remains in queue 130 or another queue, it may remain in the queue until, as discussed in detail below, a certain time period expires or a service provider 180 receives acknowledgment from a partner system 150. The event notification component 260 is referred to by a merely exemplary name and may be any suitable component. Alternatively, event notification component 260 and consumers' notification component 250 may be the same component. In that case, operation 254 may be omitted. The event notification component 260 or any other suitable component may package the high-priority notification message into its final form for delivery to the partner system 150. The high-priority notification message may include details such as the notification ID, the notification type, and the details of the notification, as discussed in further detail below. Alternatively, the high-priority notification message may have already been packaged in its final form for transmission to the partner system 150 prior to operation 222 enqueuing the high-priority notification message or at any other step. In yet another alternative, the high-priority notification message may be later packaged into its final form for delivery to the partner system 150.

In operation 262, a high-priority notification message may be transmitted to service gateway 140. If the high-priority notification message has not been previously packaged into its final form for delivery to partner system 150, it may be packaged into its final form at service gateway 140.

In operation 264, the high-priority notification message is delivered to partner system 150. The high-priority notification message includes information such as the notification ID, the notification type, and the details of the high-priority notification message. For example, the high-priority notification message can include the event type, case information, control information, device information, contact information, transaction information, a variable list, information about downstream reporting opt out, and an alert ID. The case information can include an account number, case ID, queue ID, time of high-priority message queueing, and source ID. The control information can include a date and time stamp and message type. Device information can be information about the device type and consent information for multiple devices. The contact information can include a street address, city, country, country ID, first name, full name, last name, social security number, state, and zip code. Transaction information may include information for one or more transactions, such as account type, amount, approval, whether the cardholder was present, whether the transaction triggered the case, the date and time of the transaction, a fraud score, merchant name, merchant city, merchant country/country ID, merchant state, point of sale identification information, a Swiss interbank clearing ID, a transaction ID, and a Visa advanced authorization score or similar score. A variable list may include information about names and values such as a client ID, entity name or other identifying information, and BIN. The notification may also include information about whether there has been opt-out of reporting to a downstream system such as downstream system 160 as depicted in FIG. 1. These categories of information are merely exemplary, and a high-priority notification message can include only some of this information and may also include other information.

In operation 266, service gateway 140 may receive a message or other communication acknowledging that the partner system 150 has received the high-priority notification message transmitted in operation 264. Upon receiving an acknowledgment in operation 266, service gateway 140 may, in operation 268, notify event notification server 120 that an acknowledgment has been received from the partner system 150. In operation 268, service gateway 140 may communicate the acknowledgment to event notification component 260 or any other suitable component of the notification server 120. In the alternative, service gateway 140 may not be utilized, and event notification component 260 or any other suitable component of the notification server 120 may receive acknowledgment from the partner system 150.

If notification server 120 is notified in operation 268 that partner system 150 has acknowledged the high-priority notification message, in operation 282, event notification component 260 (or any other suitable component of notification server 120) may notify database adapter 280 (or any suitable component of notification server 120) to mark the high-priority notification message as sent. In the alternative, operation 282 may be completed by the same component (for example, event notification component 260) which receives the acknowledgment notice from the service gateway 140 in operation 268.

In operation 272, service gateway 140 or whichever portion of service provider 180 is in communication with partner system 150 may register that an acknowledgment message has not been received from partner system 150. For example, after a high-priority notification message is transmitted to partner system 150 in operation 264, a timer may be set. For example, the timer could be set for 1 minute, 5 minutes, 10 minutes, or any other suitable time period. In the alternative, in operation 272, service gateway 140 may receive an error message or other notification from partner system 150 that the partner system 150 did not receive the high-priority notification message.

If an acknowledgment message is not received from a partner system 150 within the relevant time period, or the high-priority notification message is otherwise not acknowledged, then service gateway 140 may notify notification server 120 in operation 274 that an acknowledgment was not received. This notification may be received by, for example, event notification component 260 or any other suitable component of notification server 120. In operation 277, event notification component 260 or any other suitable component of notification server 120 may mark that there has been a notification error in a component such as notification service endpoint 210 or any other suitable component of notification server 120.

If event notification server 120 receives notification in operation 274 that partner system 150 has not acknowledged the high-priority notification message, a component such as event notification component 260 may in operation 275 retrieve a delayed delivery message from queue 130 or another queue via queue client 220 or any other suitable component. event notification server 120 may notify a downstream system 160 in operation 276. Such a notification may be required, for example, by a service level agreement (SLA). This notification may be the delayed delivery message created in operation 214. This delayed delivery notification may have been stored in queue client 220, queue 130, event notification component 260, service gateway 140, or any other suitable component of service provider 180. Event notification component 260 may transmit the delayed delivery notification to the downstream system in operation 276. Alternatively, any other suitable component may transmit the delayed delivery message to downstream system 160.

In operation 278, service gateway 140 or whichever portion of service provider 180 is in communication with partner system 150 may receive an update regarding the high-priority notification message from partner system 150. For example, service gateway 140 or other component may receive updates that, for example, a case has been updated, a fraud notification has been refuted, or a fraud notification has been confirmed.

In operation 286, service gateway 140 may receive a message or other communication acknowledging that the partner system 150 has acknowledged the high-priority notification message. Upon receiving an acknowledgment in operation 286, service gateway 140 may, in operation 288, notify event notification server 120 that an acknowledgment has been received from the partner system 150. In operation 288, service gateway 140 may communicate the acknowledgment to event notification component 260 or any other suitable component of the notification server 120. In the alternative, service gateway 140 may not be utilized, and event notification component 260 or any other suitable component of the notification server 120 may receive acknowledgment from the partner system 150.

If notification server 120 is notified in operation 288 that partner system 150 has acknowledged the high-priority notification message, in operation 286, event notification component 260 (or any other suitable component of notification server 120) may notify database adapter 280 (or any suitable component of notification server 120) to mark the high-priority notification message as acknowledged in operation 290. In the alternative, operation 290 may be completed by the same component (for example, event notification component 260) which receives the acknowledgment notice from the service gateway 140 in operation 288.

In operation 291, service gateway 140 or whichever portion of service provider 180 is in communication with partner system 150 may register that an acknowledgment message has not been received from partner system 150. For example, after a high-priority notification message is transmitted to partner system 150 in operation 264, after an acknowledgment is received in operation 266, and/or an update is received in operation 278, a timer may be set. For example, the timer could be set for 1 minute, 5 minutes, 10 minutes, or any other suitable time period. In the alternative, in operation 291, service gateway 140 may receive an error message or other notification from partner system 150 that the partner system 150 did not receive the high-priority notification message.

If an acknowledgment message is not received from a partner system 150 within the relevant time period, or the high-priority notification message is otherwise not acknowledged, then service gateway 140 may notify notification server 120 in operation 292 that an acknowledgment was not received. This notification may be received by, for example, event notification component 260 or any other suitable component of notification server 120. In operation 294, event notification component 260 or any other suitable component of notification server 120 may mark that there has been a notification error in a component such as notification service endpoint 210 or any other suitable component of notification server 120.

If event notification server 120 receives notification in operation 292 that partner system 150 has not acknowledged the high-priority notification message, a component such as event notification component 260 may in operation 275 retrieve a delayed delivery message from queue 130 or another queue via queue client 220 or any other suitable component. Event notification server 120 may notify a downstream system 160 in operation 276. Such a notification may be required, for example, by a service level agreement (SLA). This notification may be the delayed delivery message created in operation 214. This delayed delivery notification may have been stored in queue client 220, queue 130, event notification component 260, service gateway 140, or any other suitable component of service provider 180. Event notification component 260 may transmit the delayed delivery notification to the downstream system in operation 276. Alternatively, any other suitable component may transmit the delayed delivery message to downstream system 160.

In operation 284, database adapter 280 or any other suitable component of notification server 120 may instruct queue client 220 to remove the delayed delivery message. Alternatively, in operation 284, the message to remove the delayed delivery message may be delivered to whichever component of notification server 120, queue 130, or service gateway 140 is storing the delayed delivery message. Operation 284 may be performed after a notification server 120 receives notice in either operation 268 or 288 that an acknowledgment has been received. Alternatively, operation 284 may be performed after a high-priority notification message is marked as sent in operation 282 or after a high-priority notification message is marked as acknowledged in operation 290.

Figure 3:
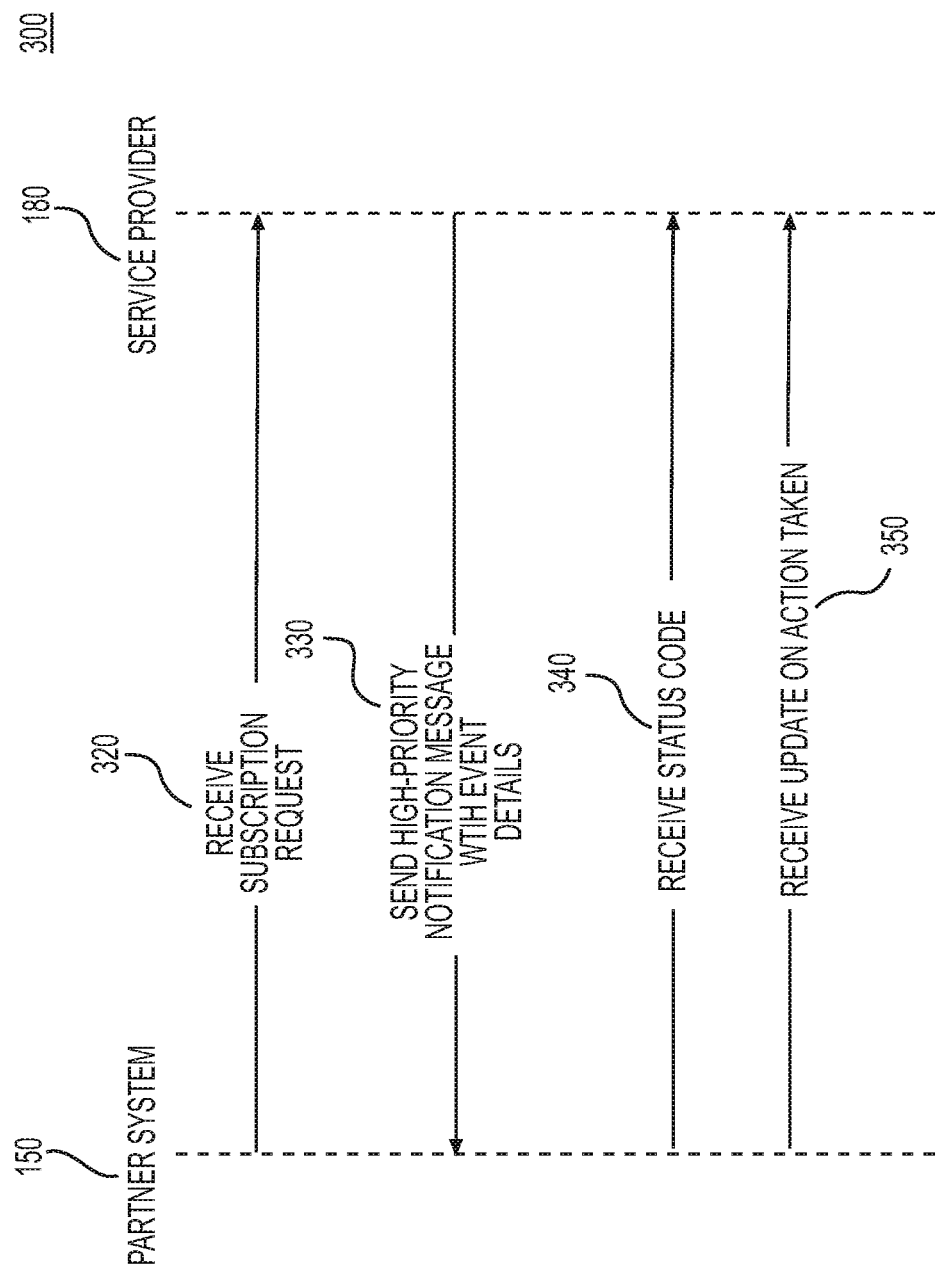
FIG. 3 is a flow chart depicting an example method for secure transmission of high-priority notification messages, according to one or more embodiments.

Turning to FIG. 3, a service provider such as service provider 180 depicted in FIG. 1 may receive in operation 320 a subscription request from a partner system such as partner system 150 depicted in FIG. 1. In operation 330, service provider 180 may send a high-priority notification message with event details to a partner system 150. In operation 340, service provider 180 may receive a status code from partner system 150. A status code, for example, may be an acknowledgment or an error message. In the alternative, a status code transmitted in operation 340 may be a failure to acknowledge a high-priority notification message within a designated time. In operation 350, service provider 180 may receive an update from partner system 150 indicating action that the partner system 150 has taken as a result of the high-priority notification message. For example, service provider 180 may receive updates from partner system 150 that, for example, a case has been updated, a fraud notification has been refuted, or a fraud notification has been confirmed.

Figure 4:
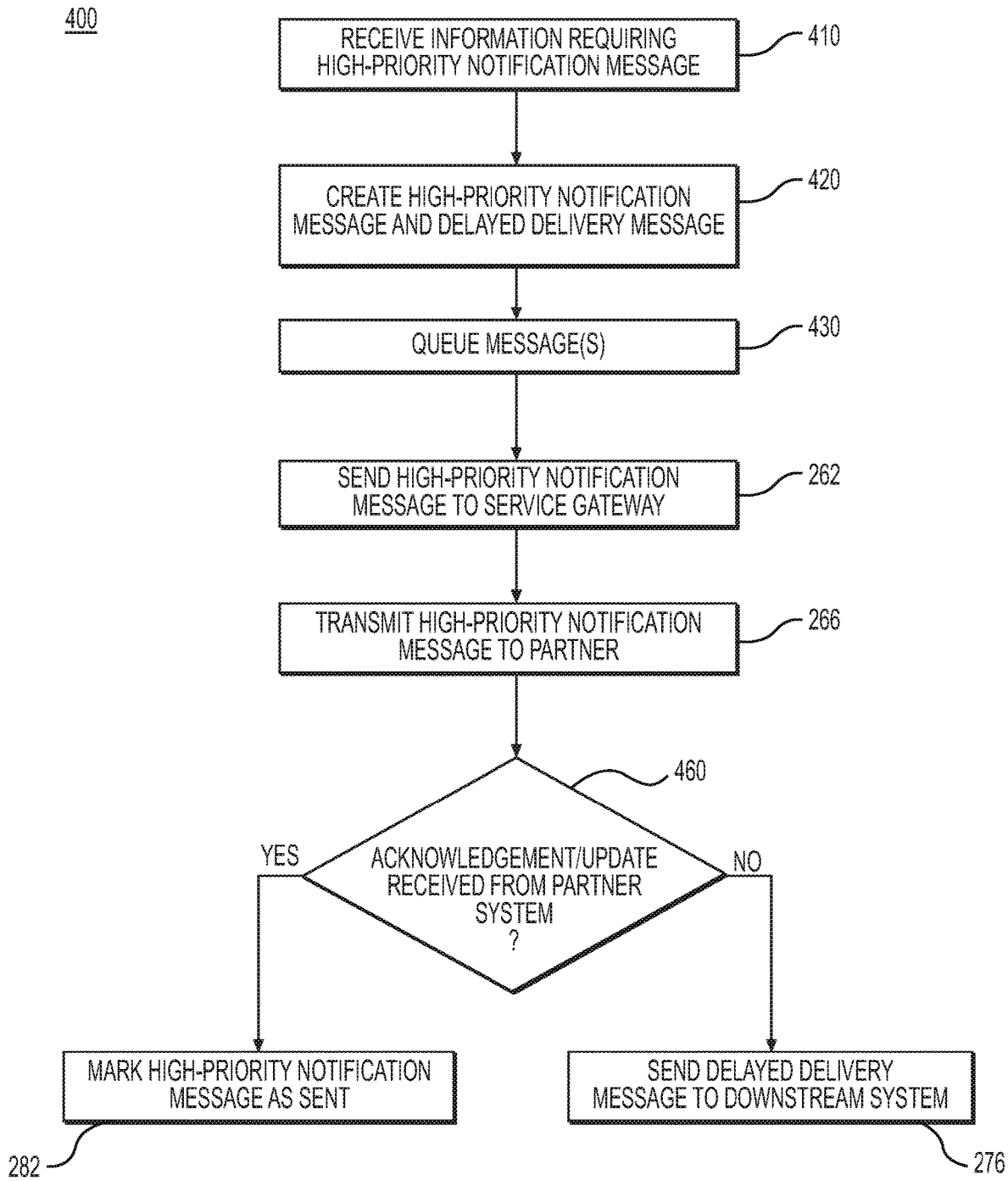
FIG. 4 is a process flow diagram depicting an example method for secure transmission of high-priority notification messages, according to one or more embodiments.

FIG. 4 shows a simplified version 400 of the steps involved in processing a high-priority notification message according to one or more embodiments. A server, such as notification server 120 shown in FIG. 1, may receive information in operation 410 which warrants that a high-priority notification message be transmitted to a third party such as partner system 150 depicted in FIG. 1. The information may be received from any source, including third-party notification source 110 as depicted in FIG. 1. Notification server 120 or another component of service provider 180 may then create a high-priority notification message and a delayed delivery message in operation 420. Operation 420 may be performed by notification service endpoint 210 as depicted in FIG. 2 or by any other suitable component. In the alternative, only one of a high-priority notification message and a delayed delivery message may be generated in operation 420. The message not created in operation 420 may be created in a later or an earlier step. For example, a delayed delivery message may not be generated until after the high-priority notification message has been transmitted, for example in operation 264 as depicted in FIG. 2.

In operation 430, one or both of the high-priority notification message and the delayed delivery message may be placed in a queue, such as queue 130 depicted in FIG. 1. The high-priority notification message may then be sent in operation 262 to a service gateway 140, as depicted in FIG. 1. In the alternative, a service gateway 140 and operation 262 may be omitted. The high-priority notification message may be sent to a third party such as partner system 150 in operation 266.

If notification server 120, service gateway 140, or other component of service provider 180 receives an acknowledgment from partner system 150 in operation 160, then service provider 180 may mark the high-priority notification message as sent. If a notification server 120, service gateway 140, or other component of service provider 180 does not receive an acknowledgment from partner system 150 in operation 160, then a notification server 120 or other component of service provider 180 may transmit a notification message such as the delayed delivery message created in operation 420 to a downstream system, such as downstream system 160 shown in FIG. 1.

Figure 5:
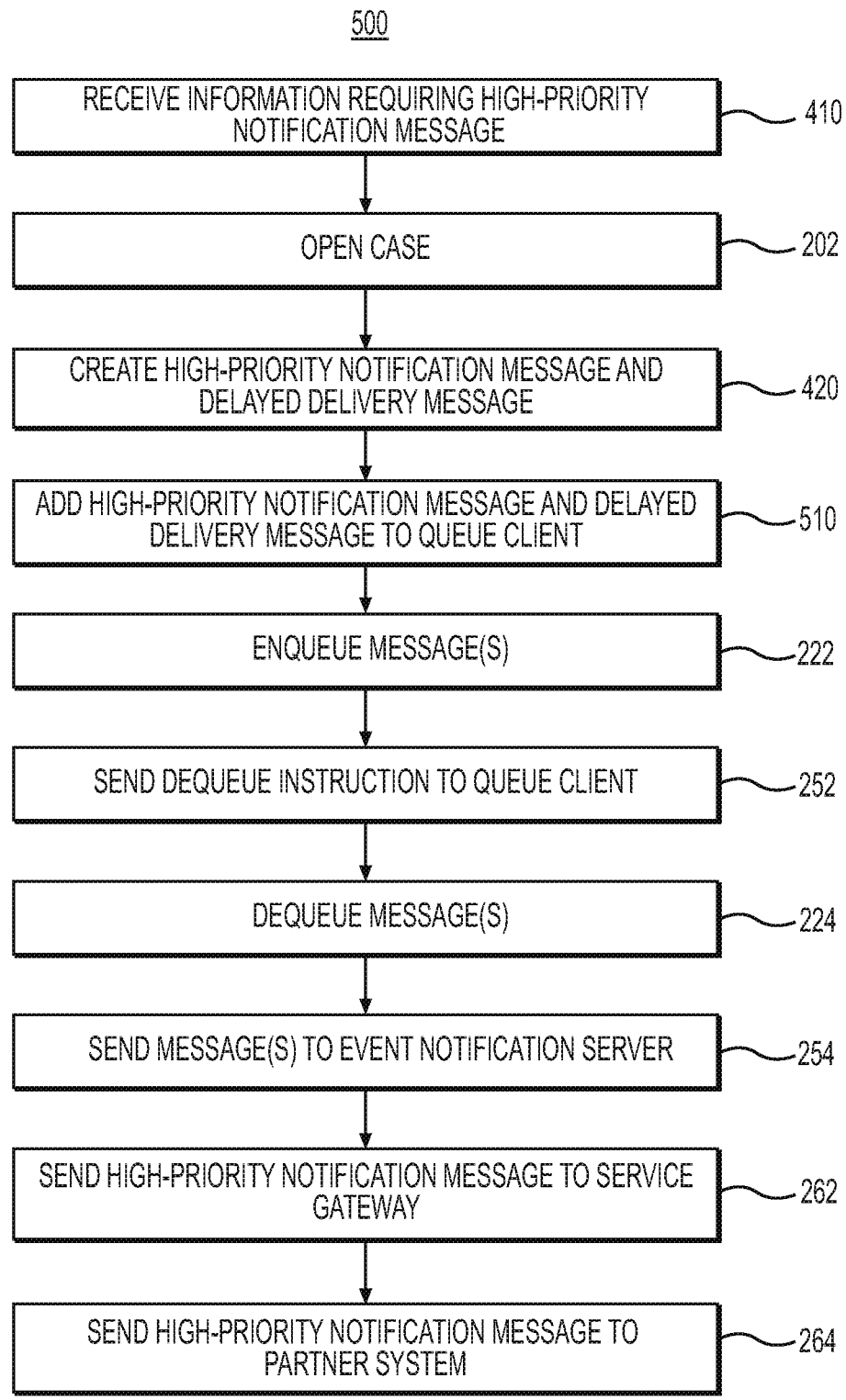
FIG. 5 is a process flow diagram depicting an example method for secure transmission of high-priority notification messages, according to one or more embodiments.
Figure 6:
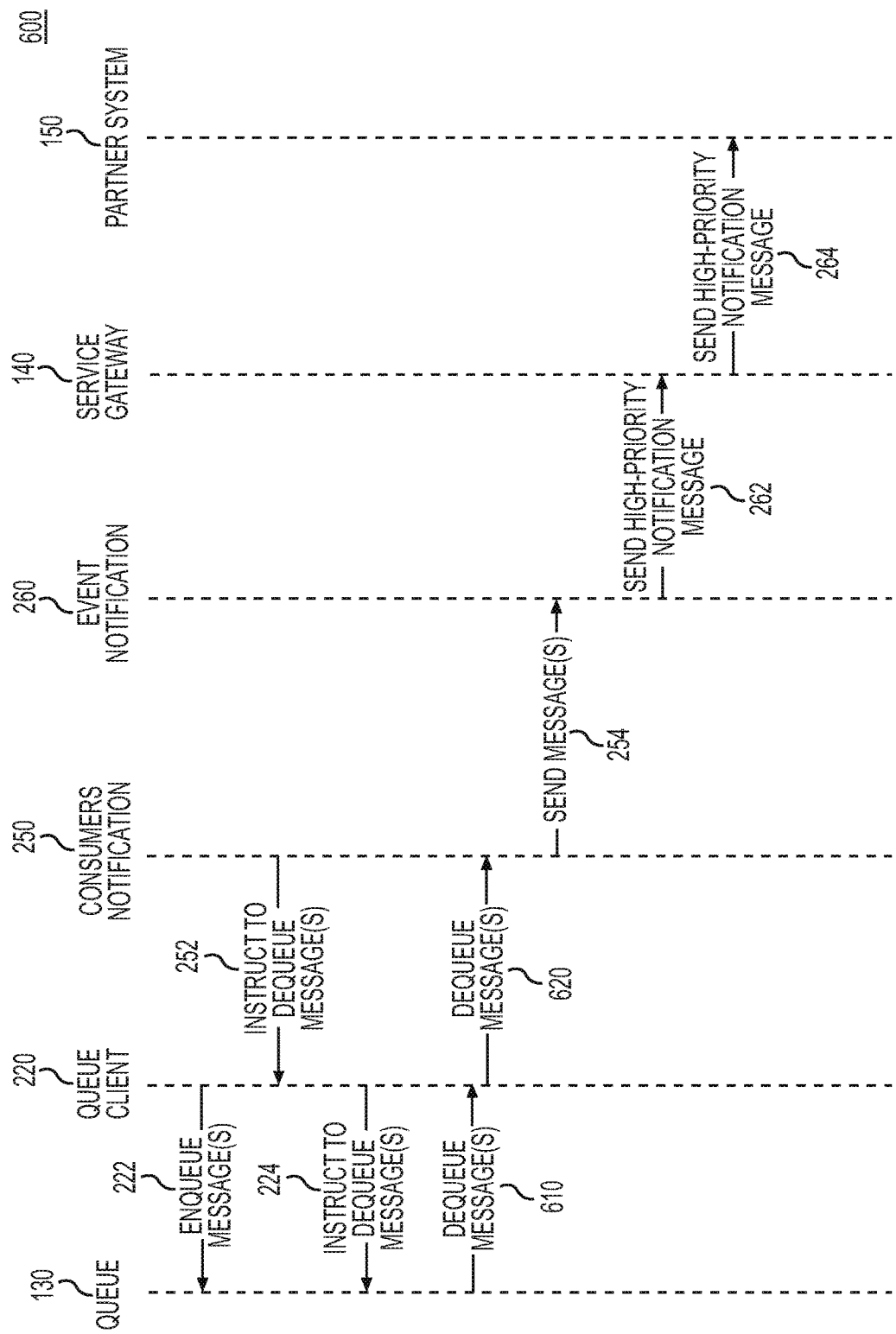
FIG. 6 is a flow chart depicting an example method for secure transmission of high-priority notification messages, according to one or more embodiments.

FIGS. 5 and 6 show the steps that may be performed by service provider 180 as shown in FIG. 1 in transmitting a high-priority notification message. As shown in FIG. 5, a service provider 180 may receive information in operation 410 as described with regard to FIG. 4. A server, such as notification server 120 depicted in FIG. 1, or any other suitable component of service provider 180, may create an event as previously described with regard to operation 202 as depicted in FIG. 2. In operation 420, a high-priority notification message and delayed delivery message may be created as described previously with regard to FIG. 4. In operation 510, a real-time notification message and delayed delivery message may be transmitted to a component such as queue client 220 as depicted in FIG. 2. In the alternative, the high-priority notification message and the delayed delivery message may be transmitted to separate components of service provider 180. In yet another alternative, only one of the high-priority notification message and the delayed delivery message may be transmitted.

As shown in FIGS. 5 and 6, in operation 222, as previously described with regard to FIG. 2, one or both of the high-priority notification message and the delayed delivery message may be placed in a queue such as queue 130 as depicted in FIG. 1. For example, queue client 220 as depicted in FIG. 2 may transmit the message(s) to queue 130.

In operation 252, as described previously with regard to FIG. 2, queue client 220 may be instructed to dequeue one or both of the high-priority notification message and the delayed delivery message. For example, consumers' notification component 250 as depicted in FIG. 2 may instruct queue client 220 to dequeue the one or more messages. In operation 224, as described previously with regard to FIG. 2, queue client 220 may instruct queue 130 to dequeue the one or more messages. In operation 610, the one or more messages may be dequeued from, for example, queue 130. One or both of a high-priority notification message and delayed delivery message may be transmitted from queue 130 to a component such as queue client 220. In operation 620, one or both of a high-priority notification message and delayed delivery message may be transmitted to another component such as consumers' notification component 250 or any other suitable component of a server such as notification server 120 depicted in FIG. 1.

In operation 254, as described previously with regard to FIG. 2, consumers' notification component 250 or any other component may transmit one or both of a high-priority notification message and a delayed delivery message to an event notification component 260 or any other suitable component. In operation 262, as previously described with respect to FIG. 2, one or both of a high-priority notification message and a delayed delivery message may be transmitted to service gateway 140 as described with regard to FIG. 1. In operation 264, as previously described with regard to FIG. 2, a high-priority notification message may be transmitted to a third-party such as partner system 150 as described with respect to FIG. 1.

Figure 7:
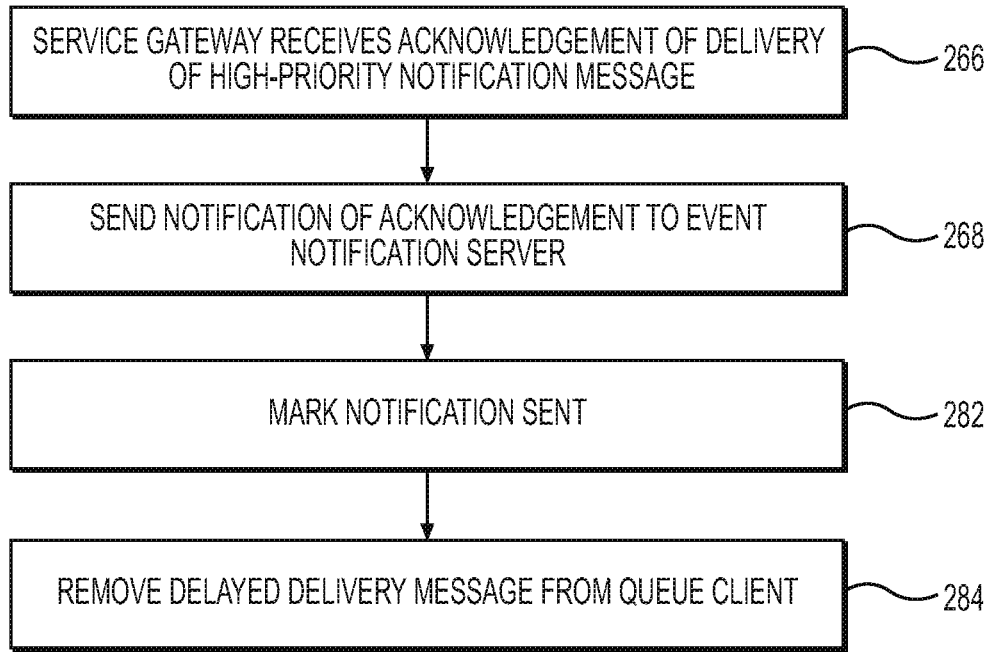
FIG. 7 is a process flow diagram depicting an example method for handling of acknowledgment of transmission of high-priority notification messages, according to one or more embodiments.
Figure 8:
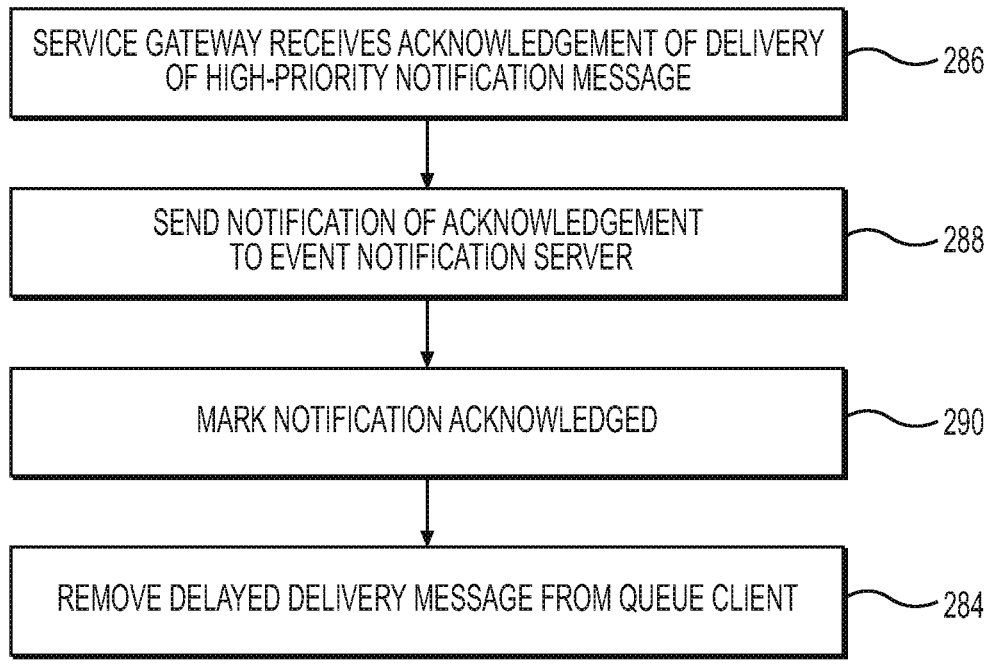
FIG. 8 is a process flow diagram depicting an example method for handling of acknowledgment of transmission of high-priority notification messages, according to one or more embodiments.
Figure 9:
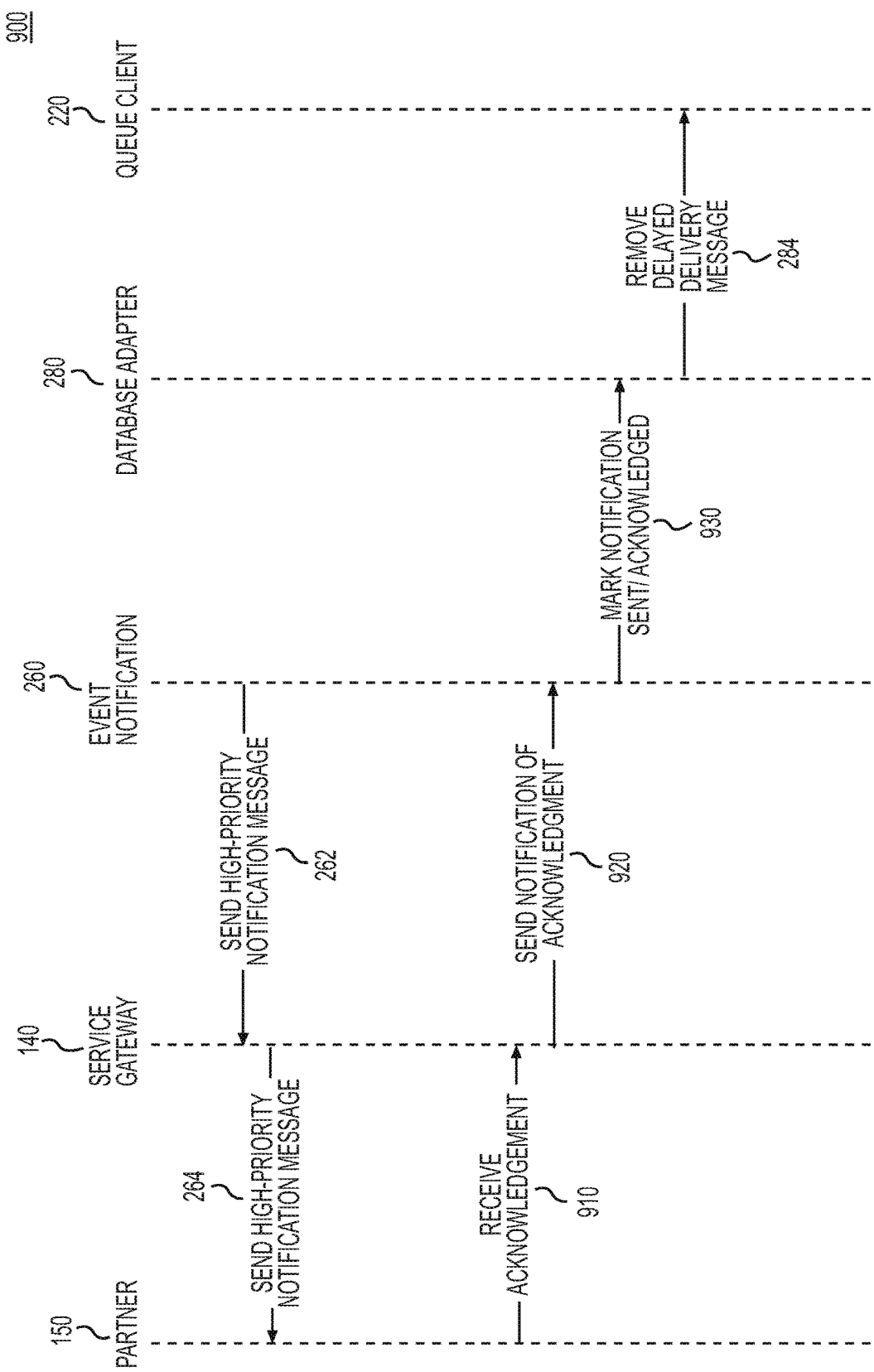
FIG. 9 is a flow chart depicting an example method for secure transmission of high-priority notification messages, according to one or more embodiments.

FIGS. 7-9 show the steps and components pertaining to acknowledgment of a high-priority notification message by a third party, such as partner system 150 depicted in FIG. 1. As shown in FIG. 7, service gateway 140 or notification server 120 as depicted in FIG. 1 may receive confirmation or acknowledgment of delivery of a high-priority notification message from a partner system 150. If service gateway 140 is utilized, in operation 268 as described previously with regard to FIG. 2, service gateway 140 may send notification of the confirmation or acknowledgment to notification server 120. In the alternative, if service gateway 140 is not utilized, operation 268 may be omitted. As previously described with regard to FIG. 2, in operation 282, the high-priority notification message may be marked as "sent" in a component of notification server 120, such as database adapter 280. In operation 284, as described with regard to FIG. 2, a delayed delivery message may be removed from a component such as queue client 220 or any other suitable component where the delayed delivery message was stored.

As shown in FIG. 8, in operation 286 (as described with regard to FIG. 2), a service provider such as service provider 180 depicted in FIG. 1 may receive an acknowledgment from a third party such as partner system 150 as shown in FIG. 1. The acknowledgment may be received concurrently with or after a status update that may include a case update, refuting fraud, confirming fraud, or any other pertinent details. As previously described with regard to FIG. 2, in operation 262, a component such as event notification component 260 may send a high-priority notification message to service gateway 140. As also described previously with regard to FIG. 2, in operation 264, service gateway 140 may send a high-priority notification message to a partner system 150.

Subsequently, in operation 288, as described with regard to FIG. 2, notification server 120 may transmit a notification of the acknowledgment to the event notification server 120. If an event notification server 120 is not used, operation 288 may be omitted. In operation 290, as described previously with regard to FIG. 2, the high-priority notification message may be marked as acknowledged in notification server 120. For example, the high-priority notification message may be marked as acknowledged in database adapter 280. In operation 284, as described previously with regard to FIG. 2, the delayed delivery message may be removed from queue client 220 or whichever component was storing the delayed delivery message.

As shown in FIG. 9, a service gateway 140 may receive an acknowledgment in operation 910. Operation 910 may be the same as or similar to an acknowledgment received in operation 266 and/or 286, as described with regard to FIG. 2. In operation 920, if service gateway 140 received the acknowledgment, service gateway 140 may send a notification to a component notification server 120 such as event notification component 260 that the acknowledgment was received. Operation 920 may be the same as or similar to operations 268 and/or 288, as described with regard to FIG. 2 If service gateway 140 was not used, then operation 920 may be omitted. In operation 930, a notification may be marked as sent or acknowledged in a database adapter 280. Operation 930 may be the same as or similar to operation 282 and/or operation 290, as described with regard to FIG. 2. In operation 284, as described with regard to FIG. 2, a component of notification server 120 such as database adapter 280, may instruct a component such as queue client 220 to remove the delayed delivery message.

Figure 10:
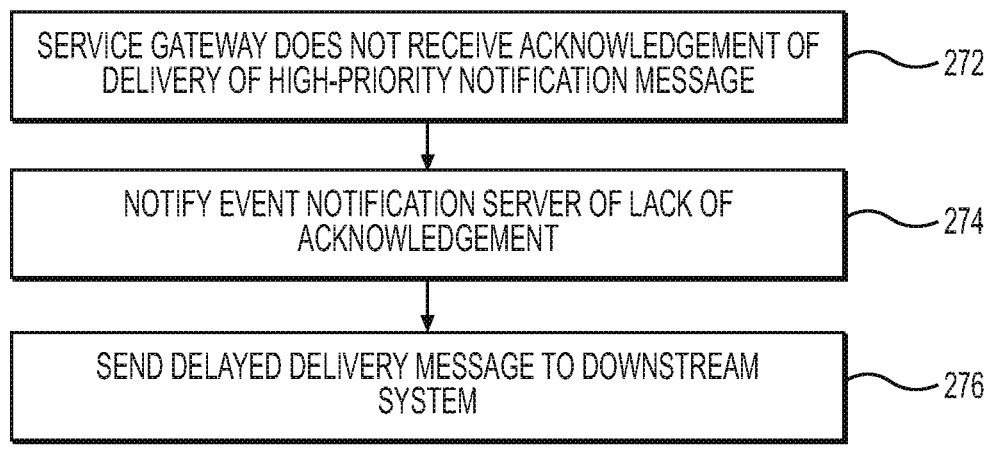
FIG. 10 is a process flow diagram depicting an example method for handling of acknowledgment of transmission of high-priority notification messages, according to one or more embodiments.
Figure 11:
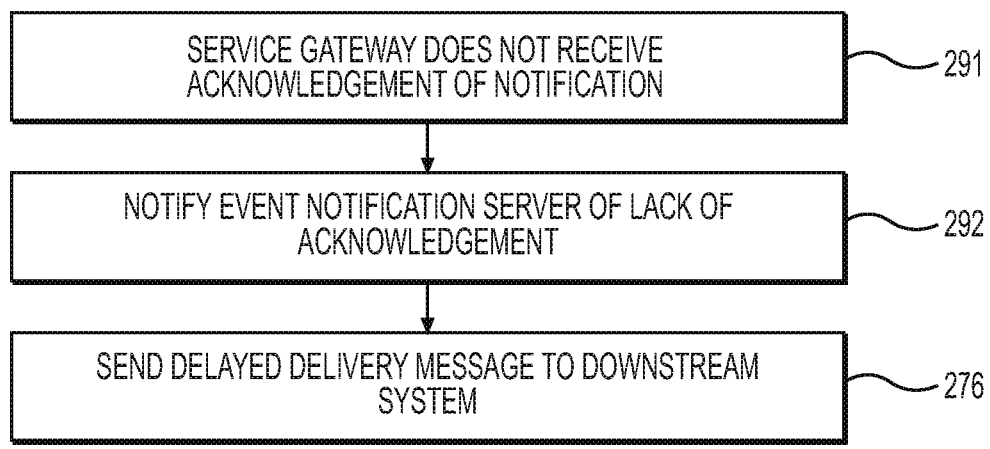
FIG. 11 is a process flow diagram depicting an example method for handling of acknowledgment of transmission of high-priority notification messages, according to one or more embodiments.
Figure 12:
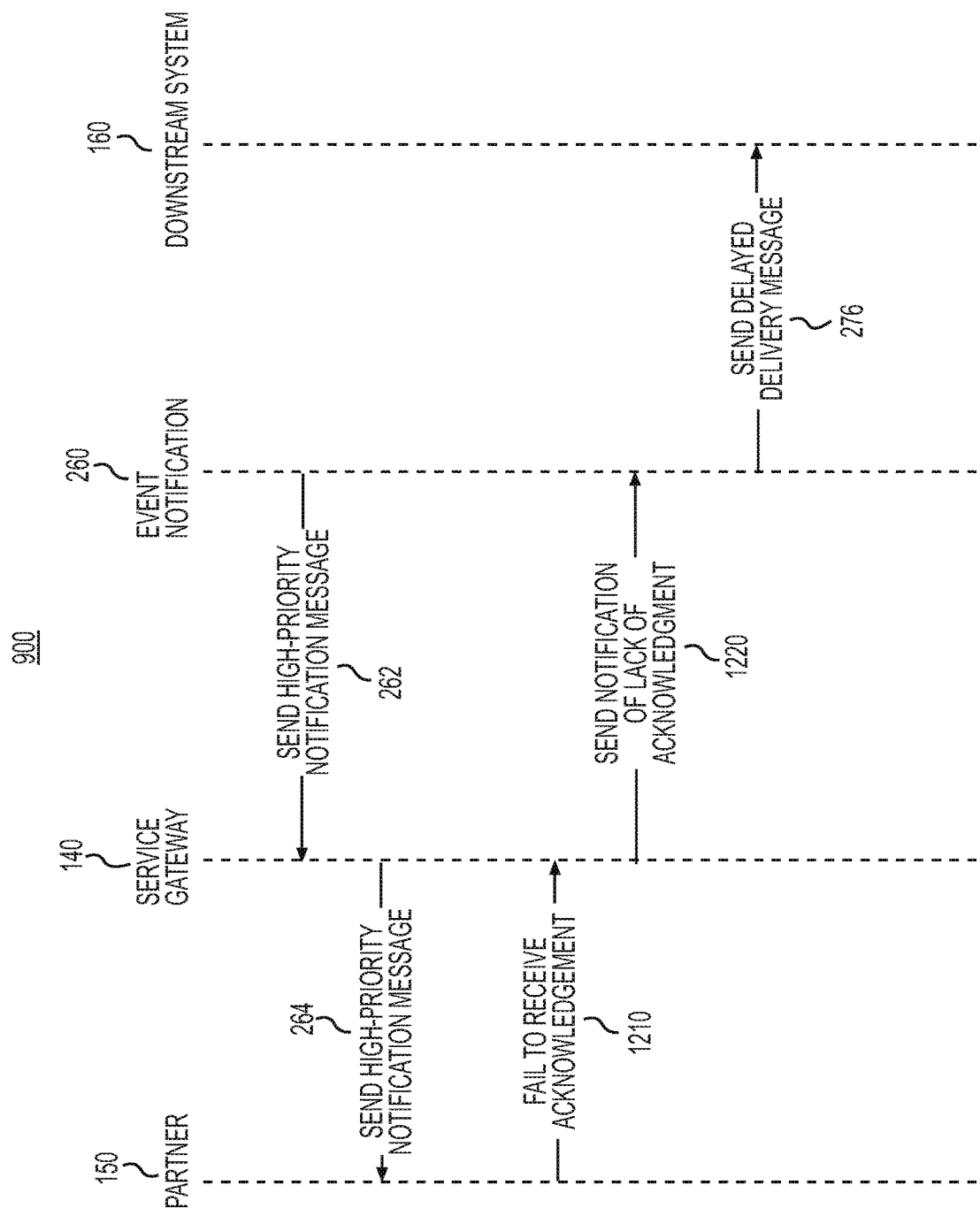
FIG. 12 is a flow chart depicting an example method for secure transmission of high-priority notification messages, according to one or more embodiments.

FIGS. 10-12 depict the steps and components pertaining to failure to receive an acknowledgment and/or status update from a third party such as partner system 150 as depicted in FIG. 1. As shown in FIG. 10, a service gateway such as service gateway 140 depicted in FIG. 1, or any other suitable component of a service provider 180, may fail to receive acknowledgment of delivery of a high-priority notification system from a partner system 150 in operation 272, as described with regard to FIG. 2. If a service gateway 140 is utilized, a server such as event notification server 120 as depicted in FIG. 1 may be notified of the lack of acknowledgment in operation 274. In operation 276, a delayed delivery message may be sent to a downstream system, such as downstream system 160 as depicted in FIG. 1.

As shown in FIG. 11, in operation 291 (as described with regard to FIG. 2), service gateway 140 as depicted in FIG. 1, or any other suitable component of a service provider 180, may fail to receive an acknowledgment from a third party such as partner system 150 as depicted in FIG. 1. If a service gateway 140 is utilized, a server such as event notification server 120 as depicted in FIG. 1 may be notified of the lack of acknowledgment in operation 292, as described with regard to FIG. 2. In operation 276, as described above with regard to FIG. 2, a delayed delivery message may be sent to a downstream system, such as downstream system 160 as depicted in FIG. 1. In the alternative, a message may be delivered to a downstream system that is separate from the transmission of a delayed delivery message as described in operation 276.

As shown in FIG. 12, a failure to receive either an acknowledgment in operation 1210 as communicated to event notification server 120 in operation 1220 may cause a delayed delivery or other message to be transmitted to a downstream system 160 in operation 276. For example, a service provider 180 may fail to receive an acknowledgment as described with regard to operations 272 and/or 291, as described with regard to FIG. 2.

Figure 13:
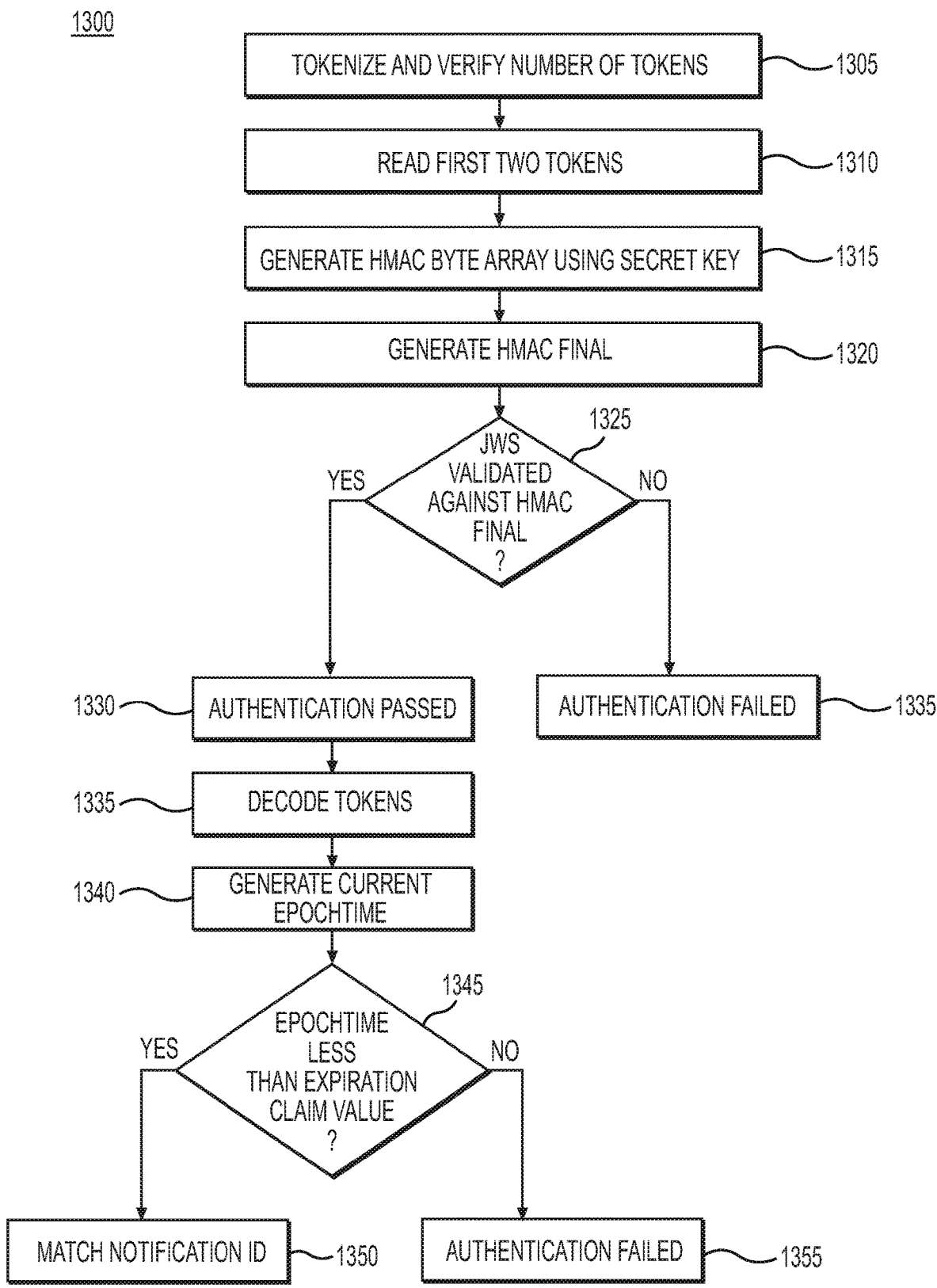
FIG. 13 depicts a process flow diagram depicting the processing of a high-priority notification message by a partner who has received the notification.

FIG. 13 depicts a process flow diagram pertaining to how messages are securely transmitted. JSON Web Signature (JWS) may be utilized in transmitting messages. A service provider such as service provider 180 depicted in FIG. 1 may provide a URL where a notification may be posted. The format for this URL may be, for example, https://<Integration_Partner_Base_Address>/ServiceProvider/notification. The header of a notification may include, for example, the following code:

```
contentType: application/json
Authorization: ServiceProvider
jwt="eyJ0eXAiOiJKV1QiLCJhbGciOiJIUzI1NiJ9.eyJpc3MiOiJWYW50aXYiLCJleHAi
OjEyMzQ1NTY2NywiaHR0cDovL3ZhbnRpdi5jb20vZXNhdXRoL2FwaS9Ob3RpZmlj
YXRpb24vaWQiOjEyMzQ1Nn0.O0b1Z-ixtPcHFmtiwlSwoNqSRznCa-
ligKqAoznlxWE"
ServiceProvider jwt:
"[ Base64Encode and URLEncode { UTF-8 (JSON Header String) } ] || "." || ["[
Base64Encode and URLEncode { UTF-8 (JSON Payload String) } ] || "." || ["[
Base64Encode and URLEncode { UTF-8 (JWS) } ]"
JSON Header String : {"typ":"JWT","alg":"HS256"}
JSON Payload String:
{"iss":"ESAuthIDP","exp":<ExpiryTime(EpochTimeInSeconds+300seconds)>,"http://
ServiceProvider.com/esauth/api/Notification/id":<notificationId>,
"caseDetail":<caseDetail>
JWS = JSON Web Signature
"Input for MAC creation" = ["[Base64Encode and URLEncode { UTF-8 (JSON
Header String) } ] || "." || ["[ Base64Encode and URLEncode { UTF-8 (JSON Payload
String) } ] ]
JWS = ["[ Base64Encode and URLEncode { UTF-8 ( MAC Byte array ("Input for
MAC creation" with "HMACSHA256 Shared Secret Key")) } ]
```

Use of an authorization header is optional and provided for additional security to protect against denial of service attacks. The [Base64Encode and URLEncode] JWT header and payload strings may not contain any "white spaces", or "New line" characters.

To decode and validate the notification, in operation 1305, the original "Service Provider JWT" from the notification header may be tokenized, and three tokens may be present: JWT Protected header, JWT Payload, and JWS. The first two tokens of the Service Provider JWT header may be read in operation 1310. In operation 1315, an HMAC Byte Array may be generated for the output of operation 1310, using HMACSHA256 Shared Secret Key. In operation 1320, a final HMAC may be generated by applying the following operation:

["[Base64Encode and URLEncode {UTF-8 (HMAC Byte Array From Step 1315)}]

In operation 1325, the JWS in the ServiceProviderJWT from Operation 1305 may validated against the final HMAC generated in operation 1320. If the JWS is validated, then the authentication passes, as shown in operation 1330. If the JWS is not validated, then the authentication fails, as shown in operation 1335.

Assuming the JWS is validated as in operation 1325, each token from operation 1305 may be subject to URLDecode and Base64Decode in operation 1335. Subsequently, in operation 1340, the current EpochTime is generated in seconds. In operation 1345, the EpochTime may then be compared to the "exp" value in the ServiceProviderJWT payload. If the current EpochTime is greater than the "exp" value in the ServiceProviderJWT payload, the authentication fails due to an expired token, as shown in operation 1355. Otherwise, if the EpochTime is less than the "exp" value, the Notification ID from the JSON Claims Payload may be matched with the Notification ID in the Original Request Body, as shown in operation 1350.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method for secure transmission of high-priority computer server event notifications, the method comprising:
   receiving server event information from a notification source;
   performing a create event operation based on the server event information;
   generating i) a high-priority notification message based on one or more data components collected via the create event operation and ii) a delayed delivery message;
   transmitting the delayed delivery message to a queue client;
   transmitting the high-priority notification message to a partner system via a security protocol, the security protocol being one of: message authentication code (MAC), JavaScript Object Notation Web Token (JWT), or Hypertext Transfer Protocol Secure (HTTPS);
   determining whether an acknowledgment message is received from the partner system;
   de-queuing the delayed delivery message based on determining that the acknowledgment is not received from the partner system; and
   transmitting the delayed delivery message to a downstream system, wherein the downstream system includes at least one of: a consumer credit management service provider system or a consumer risk management service provider system.

2. The method of claim 1, wherein the one or more data components collected via the create event operation comprise one or more of: a notification identifier (ID), a notification type, and notification details.

3. The method of claim 1, wherein the delayed delivery message indicates a notification error.

4. The method of claim 1, wherein the high-priority notification message comprises one or more of: an event type, case information, control information, device information, contact information, transaction information, or a variable list.

5. The method of claim 4, wherein the high-priority notification message further comprises information on whether there has been opt-out of reporting to a downstream system.

6. The method of claim 1, further comprising:
   removing the delayed delivery message from a queue in communication with the queue client based on determining that the acknowledgment is received from the partner system.

7. The method of claim 1, further comprising:
   determining whether an update regarding the server event is received from the partner system;
   de-queuing the delayed delivery message based on determining that the update is not received from the partner system; and
   transmitting the delayed delivery message to a downstream system.

8. The method of claim 1, wherein the delayed delivery message is transmitted to the downstream system based on a service level agreement.

9. A system for secure transmission of high-priority computer server event notifications, the system comprising:
   one or more processors; and
   one or more computer readable media comprising instructions which, when executed by the one or more processors, cause the one or more processors to perform operations comprising:
      receiving server event information from a notification source;
      performing a create event operation based on the server event information;
      generating i) a high-priority notification message based on one or more data components collected via the create event operation and ii) a delayed delivery message;
      transmitting the delayed delivery message to a queue client;
      transmitting the high-priority notification message to a partner system via a security protocol, the security protocol being one of: message authentication code (MAC), JavaScript Object Notation Web Token (JWT), or Hypertext Transfer Protocol Secure (HTTPS);
      determining whether an acknowledgment message is received from the partner system;
      de-queuing the delayed delivery message based on determining that the acknowledgment is not received from the partner system; and
      transmitting the delayed delivery message to a downstream system, wherein the downstream system includes at least one of: a consumer credit management service provider system or a consumer risk management service provider system.

10. The system of claim 9, wherein the one or more data components collected via the create event operation comprise one or more of: a notification identifier (ID), a notification type, and notification details.

11. The system of claim 9, wherein the delayed delivery message indicates a notification error.

12. The system of claim 9, wherein the high-priority notification message comprises one or more of: an event type, case information, control information, device information, contact information, transaction information, or a variable list.

13. The system of claim 12, wherein the high-priority notification message further comprises information on whether there has been opt-out of reporting to a downstream system.

14. The system of claim 9, the operations further comprising:
   removing the delayed delivery message from a queue in communication with the queue client based on determining that the acknowledgment is received from the partner system.

15. The system of claim 9, the operations further comprising:
   determining whether an update regarding the server event is received from the partner system;
   de-queuing the delayed delivery message based on determining that the update is not received from the partner system; and
   transmitting the delayed delivery message to a downstream system.

16. One or more non-transitory computer readable media comprising instructions which, when executed by one or more processors, cause the one or more processors to perform operations for secure transmission of high-priority computer server event notifications, the operations comprising:
   receiving server event information from a notification source;
   performing a create event operation based on the server event information;
   generating i) a high-priority notification message based on one or more data components collected via the create event operation and ii) a delayed delivery message;

transmitting the delayed delivery message to a queue client;

transmitting the high-priority notification message to a partner system via a security protocol, the security protocol being one of: message authentication code (MAC), JavaScript Object Notation Web Token (JWT), or Hypertext Transfer Protocol Secure (HTTPS);

determining whether an acknowledgment message is received from the partner system;

de-queuing the delayed delivery message based on determining that the acknowledgment is not received from the partner system; and transmitting the delayed delivery message to a downstream system, wherein the downstream system includes at least one of: a consumer credit management service provider system or a consumer risk management service provider system.

\* \* \* \* \*